United States Patent [19]
Lake

[11] Patent Number: 5,428,783
[45] Date of Patent: Jun. 27, 1995

[54] LAN BASED LOOSELY COUPLED LARGE GRAIN PARALLEL PROCESSING METHOD

[75] Inventor: Christopher H. Lake, Plantation, Fla.

[73] Assignee: Motorola, Inc., Schaumburg, Ill.

[21] Appl. No.: 132,075

[22] Filed: Oct. 5, 1993

Related U.S. Application Data

[63] Continuation of Ser. No. 618,858, Nov. 28, 1990, abandoned.

[51] Int. Cl.⁶ .......................................... G06F 15/173
[52] U.S. Cl. .................. 395/650; 364/DIG. 1; 364/281.6; 364/271.2; 364/228.1; 364/228.3; 364/242.95
[58] Field of Search ............. 395/650; 364/228.8, 364/230.3

[56] References Cited

U.S. PATENT DOCUMENTS

| | | | |
|---|---|---|---|
| 4,805,106 | 2/1989 | Pfeifer | 364/200 |
| 4,816,993 | 3/1989 | Takahashi et al. | 364/200 |
| 4,835,674 | 5/1989 | Collins et al. | 364/200 |
| 4,920,487 | 4/1990 | Baffes | 364/300 |
| 4,951,192 | 8/1990 | Chase, Jr. et al. | 364/200 |
| 4,951,193 | 8/1990 | Muramatsu et al. | 364/200 |
| 5,136,708 | 8/1992 | Lapourtre et al. | 395/650 |
| 5,202,971 | 4/1993 | Henson et al. | 395/625 |

*Primary Examiner*—Thomas M. Heckler
*Attorney, Agent, or Firm*—Juliana Agon; Andrew S. Fuller

[57] ABSTRACT

A parallel processing system (10) is provided to logically divide (68) a task into subtasks that can be performed simultaneously by a plurality of computers (1-4) loosely coupled in parallel via a loosely coupled interconnection (11). A file server (9) is connected to the loosely coupled interconnection (11) for sharing memory among the plurality of computers (1-4). For coordinating the cooperation of the plurality of computers (104) performing these subtasks, a controlling methodology (38) is taught.

12 Claims, 3 Drawing Sheets

LAN BASED LOOSELY COUPLED LARGE GRAIN PARALLEL PROCESSING METHOD

This is a continuation of application Ser. No. 07/618,858, filed Nov. 28, 1990, and now abandoned.

TECHNICAL FIELD

This invention relates generally to a small computer system and more particularly to the operation of a large task on a small computer system based on a local area network (LAN).

BACKGROUND

It is well known that most computer systems in current use consist of a single central processing unit CPU with a concomitant memory. In addition, dedicated parallel computers have been developed to handle more complicated or large grain tasks. These parallel computers execute parallel processing by use of a plurality of CPU's each tightly coupled by an internal bus within the dedicated computer for communication with a memory inside the dedicated parallel computer. The plurality of CPU's are also connected to each other via the same internal communication medium or bus.

To accomplish a large task in the dedicated parallel computer, the task is distributed across the available plurality of processors (CPUs) processing simultaneously. To insure that access to the shared resources such as the memory, is made by only one processor at a time, some locking mechanism must be used that allows only one processor to access the resource at any one time and locks out the other processor from accessing the resource at that time. In the case of shared information, the information is generally stored in memory and hence the locking mechanism must control access to the memory or at least to that portion of the memory wherein the shared information is stored.

A type of locking mechanism used widely in multiprocessing systems such as a dedicated parallel computer is a semaphore. A semaphore is traditionally implemented as a register or a designated memory location on which is performed a read-and-clear operation, a test-and-set operation, a read-modify-write operation or some other form of a memory operation that performs an atomic read-modify-write function. An atomic or mutual exclusive read-modify-write function is one during whose execution no other register or memory references are permitted between the read and write portions of the operation.

A parallel computer then is conceptualized as being many individual, independent CPU's networked by a high speed internal communication bus as existing presently. This dedicated parallel computer has tremendous processing power to do large tasks (large grain) but the expense of the dedicated parallel computer is also tremendous.

Recently, systems in which a plurality of less expensive work stations each having its own CPU have been developed. To let users of the workstations share files in a common memory unit called the file server, a loosely coupled local area network (LAN) connects each workstation to the fileserver. The CPU of the work station is a powerful uniprocessing individual computer (UC) that is conventionally viewed to not have the same potential as a more powerful dedicated parallel computer. However, the uniprocessing individual computers (UCs) are each independently more powerful than the individual central processing units (CPUs) of the dedicated parallel computer. The power of the UC will help make up for the slower speed of the LAN as compared to the high speed internal bus. These uniprocessing individual computers may each handle a large problem, but would require an extreme amount of time as compared to the larger, more powerful dedicated parallel computer.

It is therefore a desire to be able to accomplish large tasks on small computer systems to avoid the purchase of larger, more expensive computers to do the same complicated task in a timely fashion.

SUMMARY OF THE INVENTION

Accordingly, it is an advantage of the present invention to be able to divide a large task into sub-tasks that can be performed simultaneously by a plurality of individual uniprocessing computers connected to a file server by a local area network (LAN). This loosely coupled parallel scheme will achieve the same powerful performance benefit without the expense of the existing dedicated parallel computer.

Briefly, according to the invention, a parallel processing system is provided to logically divide a task into subtasks that can be performed simultaneously by a plurality of computers loosely coupled in parallel via a loosely coupled interconnection. A file server is connected to the loosely coupled interconnection for sharing memory among the plurality of computers. For coordinating the cooperation of the plurality of computers performing these subtasks, a controlling methodology is taught.

DETAILED DESCRIPTION OF THE PREFERRED EMBODIMENT

Figure 1:
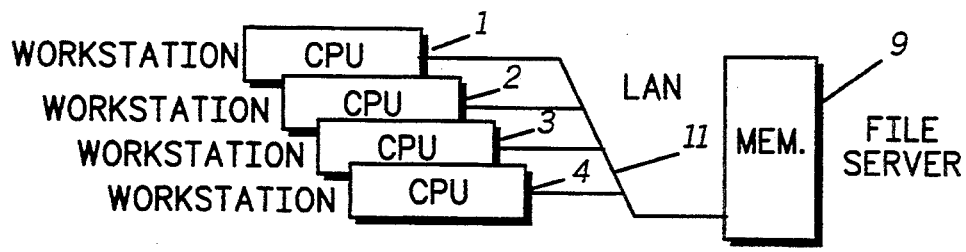
FIG. 1 is a schematic of a network of computers embodying the present invention.

Referring to FIG. 1, a network of loosely connected CPUs or work stations 1-4 is shown. Any stand alone networkable processing unit may serve as the uniprocessing computer that is labeled CPU 1-4. The CPUs 1-4 are loosely connected to each other and to a common file server 9 containing the memory for the system via any loosely coupled interconnecting means such as a wireless RF interconnecting means or a local area network LAN 11. The system synchronization and queues will reside in the LAN file server 9 which serves as the shared memory between the central processing units 1-4. Local memory can be the processor's own RAM and the UC's local hard storage inside the CPU 1-4. By using this LAN (11) approach as only one example of a loosely coupled network, users of existing powerful unique processing individual computers (UCs) 1-4 can create a parallel processing system 10 that approaches the powerful potential of the larger and more expensive dedicated parallel computer.

To reduce the overall time necessary to execute a complicated or large gain task, by one CPU (1, 2, 3, or 4) operating alone. The complicated task is shared by more than one computer. By giving each CPU 1-4 a share of the overall work, each computer 1, 2, 3, and 4 will simultaneously solve a part of the problem to reduce the total time required by a single computer 1,2, 3, or 4.

Figure 2:
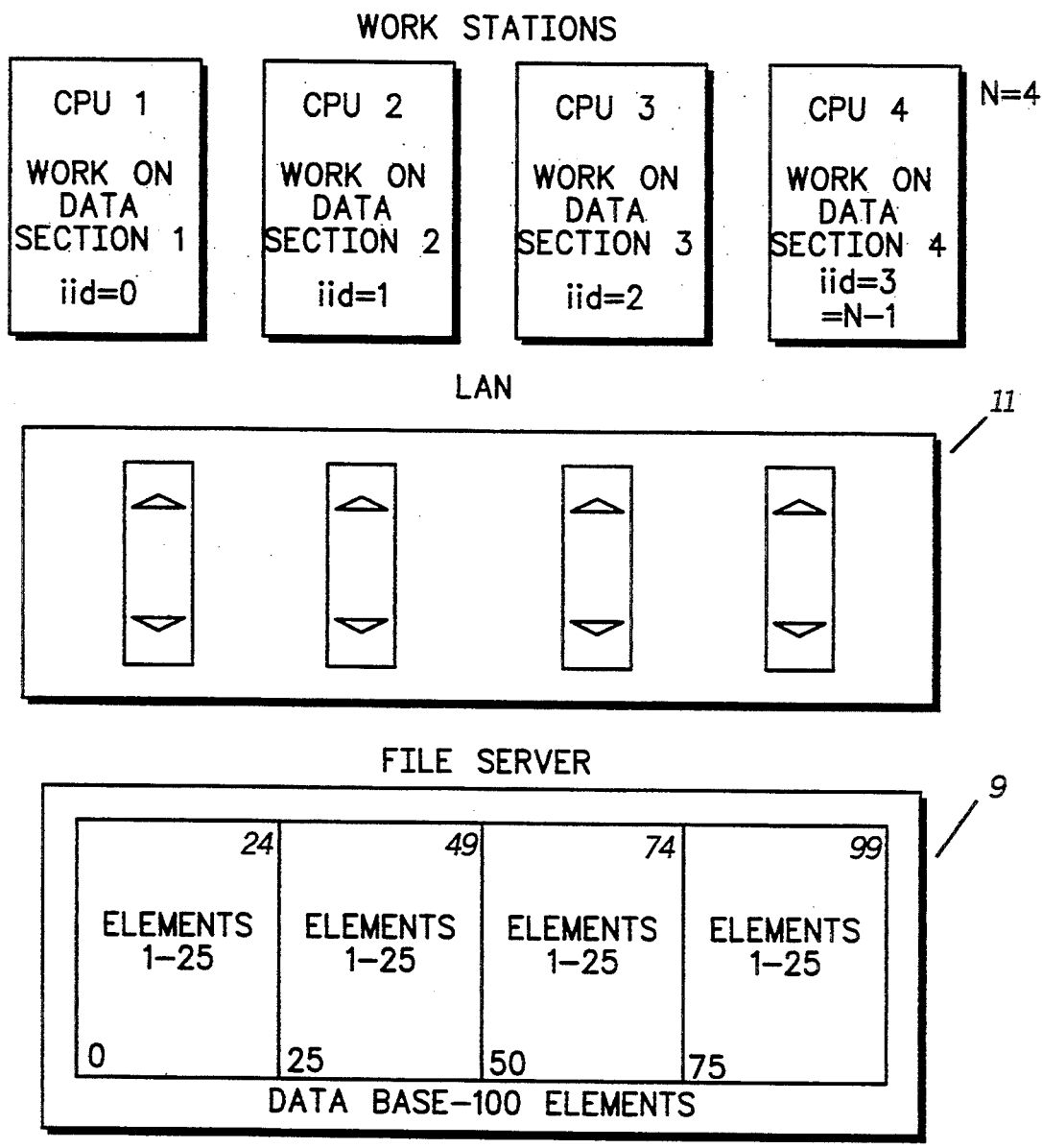
FIG. 2 shows an example of task splitting among the small computer network 10 of FIG. 1.

Referring to FIG. 2, one simple example of task splitting in a small system network 10 of FIG. 1 is illustrated in accordance with the invention. For simplicity sake, assume a large grain complicated task is to read from a shared file 100 numbers. Assuming again, for simplicity's sake, each of the numbers must be replaced with another number that is a function of the original. If it takes "T" amount of time to calculate the function for all of the numbers, the completed task will be done in "T" amount of time. However, if "N" computers (where "N" equals 4 in this example) are used across a LAN 11 to solve the problem in parallel, the total time for completion will ideally be "T" divided by "N". To accomplish this parallelism, each of the "N" computers 1–4 will receive a unique, individual identification (iid) number from 0 to N−1. This individual ID is a virtual and not a pre-defined number because it is assigned to each computer in sequence as it accesses the virtual ID semaphore as it will be described later in FIG. 3. Each processor or computer 1–4 will read the entire data into its own memory. By the virtual number iid assigned, the memory inside the file server 9 will be dedicated to each of the computers 1–4. Based on each processor's iid, it will calculate the answers to be provided to the file server 9 from location iid*S/N to location ((iid+1)*S/N)−1 where "S" is the total quantity of numbers to be read in. Each processor will then place its subset of the answers on the file server 9 for collection by the parent processor which accessed the virtual ID semaphore first to acquire iid=0. The communication to and from the file server 9, the figuring of each respective parcel of work and the final work done by the last executing processor, compose the overhead "C". The total execution time will then be increased to T/N+C, where C is the overhead cost. However, this total execution time is still much reduced from the original total time "T" required for a single processor.

Figure 3:
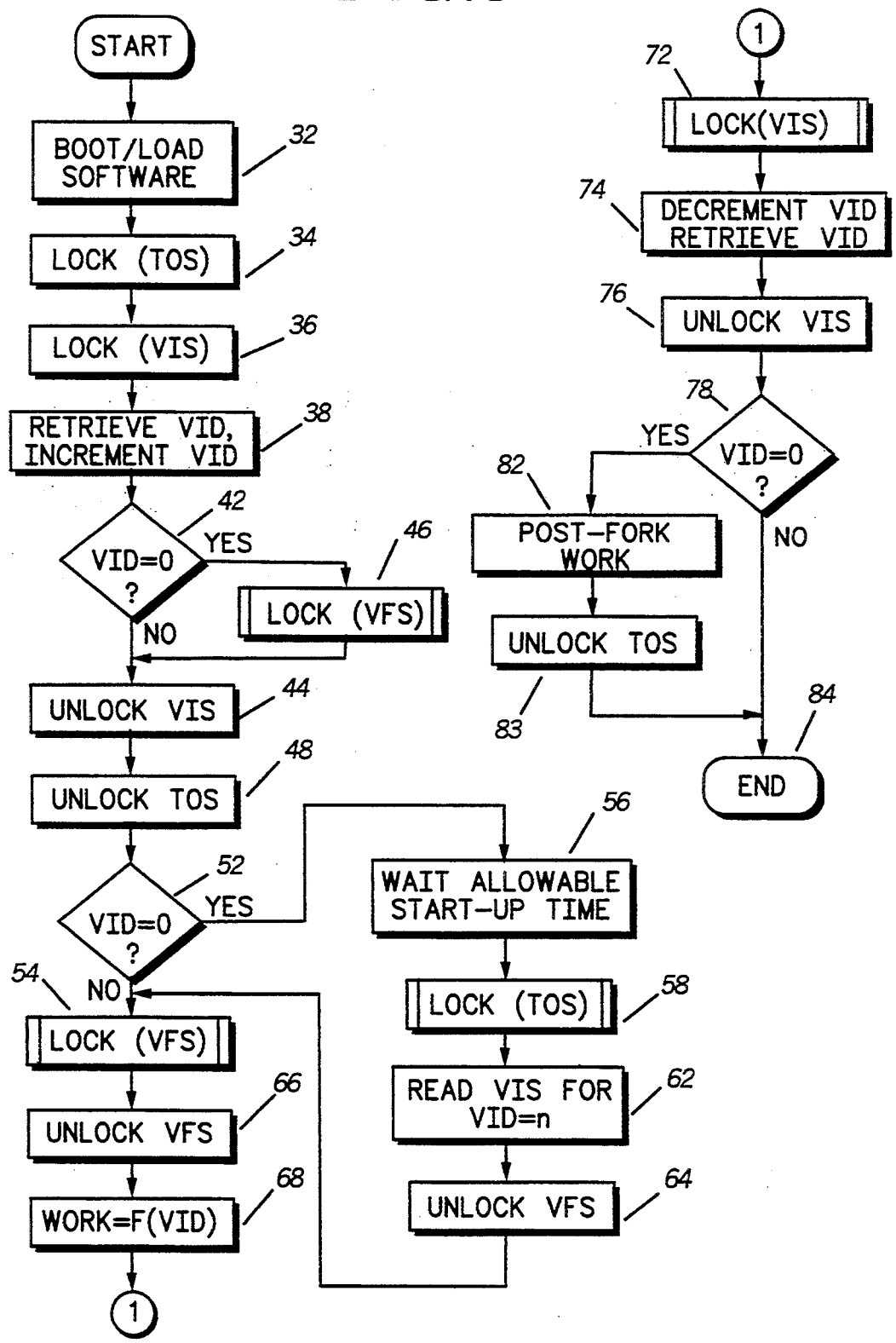
FIG. 3 is a flow chart of the major program module used to implement the present invention.

Referring to FIGS. 3, a flow chart for controlling the parallelism of the small computer system 10 is illustrated. This logical partition controlled software controls the partitioned work and data access for each of the plurality of computers 1–4 and will be run on each computer 1–4 in the same manner. However, due to different executing speeds of the computers 1–4 and the program itself, not all of the computers will be doing the same work but will share the work (and not necessarily in an equal manner).

As a system function in step 32, the logical partition control software starts to run by being booted and loaded. The routine proceeds to step 34, where a time-out semaphore (TOS) is locked to stop any other computer from entering the rest of the routine. Any other computer, other than the first computer who enters this point and locks the semaphore file, will have to wait until the file is unlocked to continue proceeding. As previously described, a semaphore allows access to a file by only one computer at a time to make the file mutually exclusive. This time-out semaphore is a preparation step to lock some information so that any other computer does not enter the lock virtual ID semaphore file (36), while the first or a previous computer is in the process of currently updating the virtual ID information (38).

Figure 4:
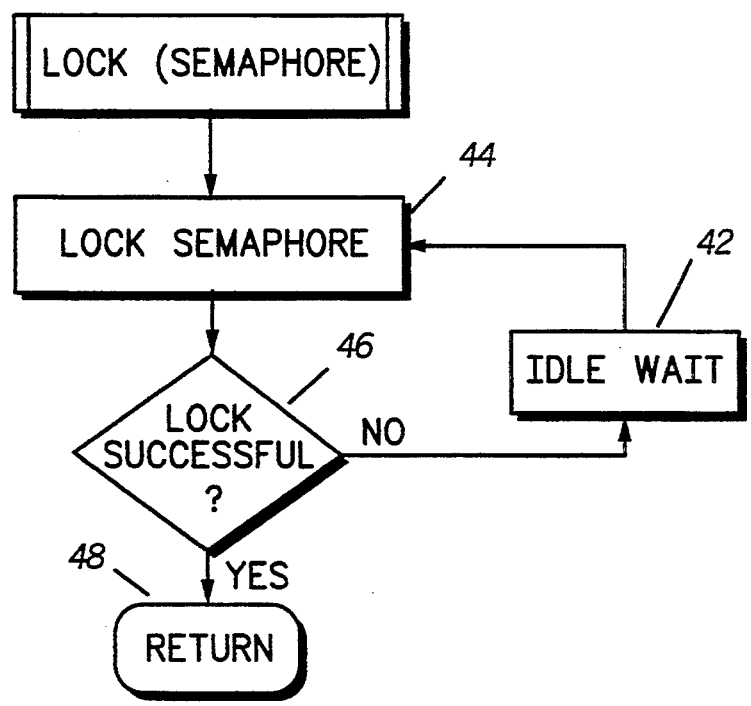
FIG. 4 is a flow chart of a subroutine illustrating a generic lock semaphore used in FIG. 3.

Referring to FIG. 4, a generic lock semaphore sub-routine is illustrated in more detail. The mutual exclusion provided by any generic lock semaphore of this example is implemented at the file server 9 to lock files such as the time-out, virtual ID, and virtual fork semaphore files. The first computer which enters the lock semaphore step 44 or any other computer, if the file is currently unlocked, can lock the semaphore file. A timing loop is continuously traversed in an idle wait step 42 and locking step 44, if someone else has already locked the file such that the lock is unsuccessful by the current computer as determined in decision block 46. If the lock is successful, the sub-routine returns to the main program in step 48.

Returning to the main program in FIG. 3, a similar virtual ID semaphore is locked in step 36. Each UC 1–4 will decide what to do based on a unique virtual ID number supplied to it by the control software of FIGS. 3. In step 38, each UC 1–4 will retrieve the current virtual ID stored in the virtual ID semaphore file as its own individual ID (iid) and will increment the virtual ID in the semaphore file for the next computer to retrieve. The first computer that locks the semaphores in steps 34 and 36, is termed the parent processor and would have retrieved a virtual ID VID=0 as its own individual ID (iid=0). Since the VID is equal to 0 for the parent processor in decision block 42, the parent processor will take the "yes" branch and lock the virtual fork semaphore in step 46. The virtual fork semaphore provides synchronization for the plurality of computers 1–4 such that while this file is locked, none of the computers can proceed (or fork) to work on different parts of the given task based on their different virtual id numbers.

The parent processor will unlock both the virtual ID semaphore in step 44 and the time-out semaphore in a subsequent step 48 for the next computer to proceed. Since the virtual ID semaphore is now unlocked, the subsequent computers that enters this part of the routine, one at a time as allowed by the time-out semaphore, will each retrieve the virtual ID that was incremented by the last computer in step 38 as their own virtual ID and increment and store the virtual ID for the next computer. All of the computers subsequently following the parent computer, (having VID not equal to 0) will take the "no" branch of the "virtual ID equals 0 ?" decision block 42 in unlocking the virtual ID semaphore in step 44 and the time-out semaphore in step 48 for the next computer to retrieve its own unique identification number. After the virtual ID and time-out semaphores have been locked and unlocked for the last time, in steps 36 and 44, each available computer in the network will now have received a unique virtual or individual ID number.

To synchronize all of the computers 1–4, the first or parent processor having a virtual ID=0, will take the "yes" branch in another "virtual ID equals 0?" decision block 52. A predetermined start-up time will be waited by the first or parent computer in step 56 to allow time for the rest of the computers to catch up to the parent and to retrieve their own unique IDs. After this catch-up time has passed, the time-out semaphore will be locked in step 58 by the parent computer so that no other computer can enter the network who currently does not have a unique virtual ID assigned to them. As previously described, the virtual ID semaphore contains a number associated with the sequence of computers accessing the semaphore file and is incremented as the virtual ID for the next computer to retrieve. The last incremented virtual ID in the semaphore file VIS can now be read by the parent computer in step 62 for VID=N where N is the total number of computers currently participating. Now that each computer has now received a virtual ID number, that virtual ID is what will facilitate the parallelism to keep the system dynamic and easily expandable. The virtual fork semaphore is then unlocked by the parent processor in step 64.

The lock and unlock virtual fork semaphore steps 54 and 66, taken by all the computers 1–4 are merely wait states to achieve computer synchronization. All but the first processor each having a virtual ID not equal to 0, will take the "no" branch in the "virtual ID equals 0?" decision block 52 as part of the synchronization scheme. Since the parent processor has already locked the virtual fork semaphore in step 46 or 54 and if the parent has not unlocked it yet in step 64 or 66, the rest of the computers will have to wait in the attempt to lock virtual fork semaphore step 54.

The actual logical partition of the work and data via the VID number is done in step 68. The work is partitioned as a function of the virtual ID number that was retrieved by each of the computers as is described for the simple example of FIG. 2.

After all the partitioned work has been done, the virtual ID semaphore is again locked in step 72. In step 74, the first computer which executes the fastest to arrive at this point will lock the virtual ID semaphore file. Since the virtual ID semaphore file was last incremented to N, this first post-work computer will decrement the virtual ID file and retrieve the decremented value (N−1) as its new virtual ID number, not necessarily equal to the original virtual ID number used in partitioning work. This first post-work computer will then unlock the virtual ID semaphore file for the rest of the computers. Proceeding to another "VID=0?" decision block 78, the first post-work computer having a VID=N−1 which does not equal 0 (assuming there is more than one computer in this parallel network) will take the "no" branch and end the routine in step 84 without doing any more work.

In turn, the rest of the computers will decrement the current virtual ID semaphore file and retrieve the decremented value in step 74, after each previous computer sequentially locks and unlocks the virtual ID semaphore in steps 72 and 76. The last or slowest executing computer or processor will now have its virtual ID equal to 0 after decrementing the virtual ID semaphore file. This last computer will be the only one to take the "yes" branch from the "virtual ID=0?" decision block 78 to do any post-fork work in step 82. Post-fork work is whatever work that is needed to achieve a final result or answer.

All of the rest of the computers will take the "no" branch from the decision block 78 and end the routine in step 84, just as the first executing post-work computer has done. The last processor after finishing the post-fork work in step 82 will likewise end the routine in step 84, after unlocking the time-out semaphore in step 83.

In summary, by the use of semaphores and the control of virtual ID numbers, a plurality of computers connected on a loosely coupled network such as a LAN can be logically controlled to partition work in a parallel processing scheme to do large tasks, normally too time consuming for a small computer.

What is claimed is:

1. A simulated parallel processing system, comprising:

a common file server having a common shared memory containing system synchronization and queue controls;

a shared resource having the instructions for performing predetermined operations of a task and controlling means, comprising a logical partition control file including virtual identification generating means, for controlling and synchronizing the accesses of the shared resource, said task predeterminately subdivided into N individual subtasks and an unassigned compilation task, said task may be formed from N multiples of the same subtask operated on by different computers or from N different portions of said task, and each subtask assigned to a unique virtual identification, wherein said compilation task adds the N individual results of each of the subtasks to form one final result of the task, said resource stored in said common memory;

a plurality of copies of the instructions for performing the task, the copies being replicas of each other and available in said common file server;

a plurality of asynchronously and parallelly operative N computers not having a common internal bus, each computer having a local memory, each computer connected to the common file server for accessing the resource and copying one copy of said instructions into the local memory, each computer for individually performing the individual subtask assigned to that computer, in parallel, in accordance with the controlling means;

loosely coupled interconnection means for coupling each of said plurality of computers in a parallel network and coupling each computer to said common file server for providing each computer access to said plurality of copies of said instructions for performing the respective individual subtask;

said controlling means, coupled to said resource and responsive to performance by one of said computers on said resource of one of said instructions in a given copy, for preventing access of all other computers for preventing performance of said instruction until the instruction is performed by said one computer on the given copy to form a time-ordered sequence, for coordinating cooperation of said plurality of computers performing said predetermined operations, wherein the controlling means comprises:

a first semaphore file for assigning a unique virtual identification for each of said plurality of computers, immediately after each computer has copied one copy of said instructions and attempts to start performing said instructions, and for preventing processing of the same virtual identification for any two computers, wherein the assignment is processed in a time-ordered sequence depending on which computer accesses said first semaphore file first, wherein the first computer accessing said first semaphore file is assigned the virtual identification associated with being the first computer, the second computer accessing said first semaphore file is assigned the virtual identification associated with being the second computer, and so on in said time-ordered sequence, until the Nth computer accessing said first semaphore file is assigned the virtual identification associated with being the Nth computer;

memory allocation means for predeterminately apportioning said common memory into dedicated sub-memory portions each correspondingly associated with each of said unique virtual identification of each computer for storing the individual results performed by each computer;

said task predeterminately subdivided into subtasks present in each computer, wherein each computer has a copy of the instructions for performing the individual subtask assigns itself the unique virtual identification according to the virtual identification of each computer assigned as controlled by said first semaphore file, for later performance of said subtask, having the same corresponding unique virtual identification, by each computer in parallel with each other;

a second semaphore file for controlling the start of subtask processing of subtask result, of each of said plurality of computers, wherein the first computer, the second computer, and up to and including the N−1th computer each has to wait till the Nth computer has been assigned the virtual identification associated with being the Nth computer before allowing each of the computers to all synchronously with all other computers start performing its assigned subtask, in parallel, to generate the individual subtask result and ending performance by accessing said dedicated sub-memory portion to place the individual result of the predeterminately associated subtask onto said dedicated sub-memory portion; and a third semaphore file for assigning said compilation task and controlling post-performance desynchronization of said plurality of computers for allowing only the last computer accessing its dedicated sub-memory portion to complete performance of said task by compiling all of the individual results located individually in each dedicated sub-memory portion to form one final result for said task, on said file server, wherein the assignment is processed in the time-ordered sequence depending on which computer accesses its said dedicated sub-memory portion first, wherein the first computer accessing its said dedicated sub-memory portion is re-assigned the virtual identification associated with being the first computer, the second computer accessing its said dedicated sub-memory portion is re-assigned the virtual identification associated with being the second computer, and so on in said time-ordered sequence, until the second-to-last computer accessing its said dedicated sub-memory portion is re-assigned the virtual identification associated with being the second-to-last computer and the Nth computer accessing its said dedicated sub-memory portion is re-assigned the virtual identification associated with being the last computer, the first computer to complete its subtask and up to and including the second-to-last computer each terminates its subtask, and only the last computer is assigned said compilation task and said last computer completes both its assigned subtask and said compilation task.

2. The parallel processing system of claim 1 wherein said first semaphore file comprises locking means for preventing all other computers not presently accessing said first semaphore means from being assigned said virtual identification, until the assignment is performed on the given copy, while allowing a performance of a wait operation.

3. The parallel processing system of claim 2 wherein said second semaphore file comprises locking means for delaying all N−1 computers from processing, until the identification assignment is performed on the last copy; and third semaphore file comprises unlocking means for permitting only the last computer to complete said compilation task.

4. The parallel processing system of claim 1 wherein said loosely coupling means comprises a local area network (LAN) coupling said plurality of computers in parallel.

5. In a simulated parallel processing networked computer system having N asynchronously and parallelly operative computers, not having a common internal bus but sharing a common file server, each computer having a local memory, a method of controlling and synchronizing the accesses of the shared resource using semaphores, the method comprising:

providing a common shared memory in the common file server;

storing a shared resource in the common shared memory;

providing instructions for performing predetermined operations of a task and a semaphoric method in the shared resource;

predeterminately subdividing the task into N individual subtasks and an unassigned compilation task, wherein the task may be formed from N multiples of the same individual subtask or from N portions of the task and the compilation task adds the N individual results of each of the individual subtasks to form one final result of the task;

assigning a unique virtual identification to each subtask;

copying the instructions for performing the task to provide a plurality of copies in the common file server;

copying one copy of the instructions into the local memory of each computer, each computer individually performing the subtask assigned to that computer, in accordance with the semaphoric method, the semaphoric method comprising:

assigning a unique virtual identification for each of the plurality of computers, immediately after each computer has copied one copy of the instructions and attempts to perform the instructions;

preventing processing of the same virtual identification for any two computers, wherein the assignment is processed in a time-ordered sequence depending on which computer accesses the shared resource first, wherein the first computer accessing the shared resource is assigned the virtual identification associated with being the first computer, the second computer accessing the shared resource is assigned the virtual identification associated with being the second computer, and so on in the time-ordered sequence, until the Nth computer accessing the shared resource is assigned the virtual identification associated with being the Nth computer;

predeterminately apportioning the common memory into dedicated sub-memory portions each correspondingly associated with each of the unique virtual identification of each computer for storing individual results performed by each computer;

each computer assigning itself the unique virtual identification according to the virtual identification of each computer assigned as controlled by the shared resource, for later performance of the subtask, having a corresponding unique virtual identification;

controlling the start of subtask processing of individual subtask result, of each of said plurality of computers, wherein the first computer, the second computer, and up to and including the N−1th computer each has to wait till the Nth computer has been assigned the virtual identification associated with being the Nth computer;

determining when the Nth computer has been assigned its virtual identification and then allowing each of the computers to start performing synchronously with all other computers its assigned subtask, in parallel, to generate the individual subtask result and ending performance by accessing the dedicated sub-memory portion to place the individual result of the predeterminately associated subtask onto the dedicated sub-memory portion; and assigning the compilation task and controlling post-performance de-synchronization of the plurality of computers by allowing only the last computer accessing its dedicated sub-memory portion to complete performance of the task by compiling all of the individual results located in each dedicated sub-memory portion to form one final result for the task, on the file server, wherein the assignment is processed in the time-ordered sequence depending on which computer accesses its dedicated sub-memory portion first, wherein the first computer accessing its dedicated sub-memory portion is re-assigned the virtual identification associated with being the first computer, the second computer accessing its dedicated sub-memory portion is re-assigned the virtual identification associated with being the second computer, and so on in the time-ordered sequence, until the second-to-last computer accessing its dedicated sub-memory portion is re-assigned the virtual identification associated with being the second-to-last computer and the Nth computer accessing its dedicated sub-memory portion is re-assigned the virtual identification associated with being the last computer, the first computer up to and including the second-to-last computer each terminates its subtask processing, and only the last computer is assigned the compilation task and the last computer completes both its individual subtask and the compilation task.

6. A method for operating a parallel processing session by a plurality of computers loosely coupled to a common data storage system, comprising the steps of:

executing, by each of the plurality of computers, an initiation procedure, the initiation procedure for a particular computer including the steps of:

securing access, by the particular computer, to a control resource on the common data storage system;

determining that the particular computer is a parent processor when the particular computer is the first of the plurality of computers to access the control resource during the parallel processing session;

designating as participating processors for the parallel processing session, the computers of the plurality of computers securing access to the control resource;

executing, by each of the participating processors, a subtask of a particular task;

determining that a particular participating processor is a post-work processor when the particular participating processor is the last to complete its subtask; and performing, by the post-work processor, any activity needed to complete the particular task for the parallel processing session.

7. The method of claim 6, wherein the step of securing access comprises the steps of:

retrieving a particular identifier stored in a semaphore file; and storing a different identifier in the semaphore file after the particular identifier is retrieved.

8. The method of claim 7, wherein the step of determining that the particular computer is a parent processor comprises the step of determining whether the identifier stored in the semaphore file corresponds to an initial value.

9. The method of claim 8, wherein the step of storing a different identifier comprises the step of incrementing a value corresponding to the particular identifier and storing the value in the semaphore file.

10. The method of claim 8, wherein the step of determining that a particular participating processor is a post-work processor comprises the steps of:

decrementing the value of the identifier stored in the semaphore file;

storing the decremented value as the identifier in the semaphore file when the decremented value does not match the initial value; and designating the particular participating processor as the post-work processor when the decremented value matches the initial value.

11. The method of claim 6, further comprising the step of blocking, by the parent processor, participation in the parallel processing session by a computer not having secured access to the first control resource within a particular time period.

12. The method of claim 6, further comprising the step of assigning, by the parent processor, the subtasks to the participating processors.

* * * * *